US012719361B2

(12) United States Patent
Davis-Marsh et al.

(10) Patent No.: US 12,719,361 B2
(45) Date of Patent: Aug. 25, 2026

(54) METHOD FOR IMPROVING TRANSIENT RESPONSE FOR POWER CONVERTERS IN PULSE FREQUENCY MODE (PFM)

(71) Applicant: TEXAS INSTRUMENTS INCORPORATED, Dallas, TX (US)

(72) Inventors: Marc Davis-Marsh, San Jose, CA (US); Anmol Sharma, Milpitas, CA (US); Hakan Oner, San Jose, CA (US); Ankit Gupta, Sunnyvale, CA (US); Aldrin J. Paynter, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 203 days.

(21) Appl. No.: 18/789,838

(22) Filed: Jul. 31, 2024

(65) Prior Publication Data

US 2025/0279722 A1 Sep. 4, 2025

Related U.S. Application Data

(60) Provisional application No. 63/559,503, filed on Feb. 29, 2024.

(51) Int. Cl.
*H02M 3/155* (2006.01)

(52) U.S. Cl.
CPC .................................. *H02M 3/155* (2013.01)

(58) Field of Classification Search
CPC .................................................... H02M 3/155
See application file for complete search history.

(56) References Cited

U.S. PATENT DOCUMENTS

2016/0336957 A1* 11/2016 Bernardinis ............. H03K 7/08
2021/0083583 A1* 3/2021 Becker ...................... H03K 5/24
2024/0405656 A1* 12/2024 Harriman ............ H02M 1/0022
2025/0350287 A1* 11/2025 Seah ..................... H03L 7/0891

* cited by examiner

*Primary Examiner* — Rafael O De Leon Domenech
(74) *Attorney, Agent, or Firm* — Charles F. Koch

(57) ABSTRACT

A first input of a modulator circuit is coupled to a current feedback terminal. An output of the modulator circuit is coupled to an input of a power stage circuit. A first input, a second input, and an output of a voltage compensation circuit are coupled to a voltage feedback terminal, a voltage reference terminal, and a compensation terminal, respectively. A first input of a summing circuit is coupled to the output of the voltage compensation circuit. An output of the summing circuit is coupled to a second input of the modulator circuit. An output of an offset generation circuit is coupled to a second input of the summing circuit. An input of a filter circuit is coupled to the output of the voltage compensation circuit. An output of the filter circuit is coupled to an input of the offset generation circuit.

20 Claims, 7 Drawing Sheets

REFERENCE VOLTAGE GENERATION CIRCUIT
FROM FIG. 6A
102
104
106
112
406
418
600
116
114a
504a
504
622a
622
622b
504b
114
508
506
506a
624a
624
624b
628a
628
502a
502b
118
508a
626a
626
626b
628b
506b
502
114b
502c
114c
404a
404b
404
404c
120
122a
310a
602b
602a
310
602
602c
604
604c
310b
606a
606b
604a
604b
606
630
310c

METHOD FOR IMPROVING TRANSIENT RESPONSE FOR POWER CONVERTERS IN PULSE FREQUENCY MODE (PFM)

REFERENCE TO RELATED APPLICATION

This Application claims the benefit of Provisional Application No. 63/559,503, filed on Feb. 29, 2024, the contents of which are hereby incorporated by reference in their entirety.

BACKGROUND

Direct current (DC)-to-DC converters and alternating current (AC)-to-DC converters, which may be referred to collectively as power converters, are widely employed in devices of today to perform power conversion. Generally, power converters receive a nominal voltage from a power source, such as a battery, and provide a regulated output voltage at one or more voltage levels. A variety of power converters and topologies can be employed to perform this power conversion. For example, buck converters, boost converters, and buck-boost converters are three basic types of power converter technologies.

SUMMARY

A circuit includes a power stage circuit, a modulator circuit, a voltage compensation circuit, a summing circuit, an offset generation circuit, and a filter circuit. The power stage circuit has an input and an output. The modulator circuit has a first input, a second input, and an output. The first input of the modulator circuit is coupled to a current feedback terminal. The output of the modulator circuit is coupled to the input of the power stage circuit. The voltage compensation circuit has a first input, a second input, and an output. The first input of the voltage compensation circuit is coupled to a voltage feedback terminal. The second input of the voltage compensation circuit is coupled to a voltage reference terminal. The output of the voltage compensation circuit is coupled to a compensation terminal. The summing circuit has a first input, a second input, and an output. The first input of the summing circuit is coupled to the output of the voltage compensation circuit. The output of the summing circuit is coupled to the second input of the modulator circuit. The offset generation circuit has an input and an output. The output of the offset generation circuit is coupled to the second input of the summing circuit. The filter circuit has an input and an output. The input of the filter circuit is coupled to the output of the voltage compensation circuit. The output of the filter circuit is coupled to the input of the offset generation circuit.

A circuit includes a voltage-to-current converter, a summing circuit, a current mirror circuit, a current valve circuit, a current source circuit, and a filter circuit. The voltage-to-current converter circuit has an input, a first output, and a second output. The summing circuit has a first input, a second input, and an output. The first input of the summing circuit is coupled to the first output of the voltage-to-current converter circuit. The current mirror circuit has an input and an output. The output of the current mirror circuit is coupled to the second input of the summing circuit. The current valve circuit has an input, an output, and a control terminal. The output of the current valve circuit is coupled to the input of the current mirror circuit. The current source circuit has an output coupled to the input of the current valve circuit. The filter circuit has an input and an output. The input of the filter circuit is coupled to the second output of the voltage-to-current converter circuit. The output of the filter circuit is coupled to the control terminal of the current valve circuit.

A circuit includes a power stage circuit, a modulator circuit, a voltage compensation circuit, a summing circuit, an offset generation circuit, and a filter circuit. The power stage circuit is configured to output a switching signal based on a modulated signal. The modulator circuit is configured to output the modulated signal based on a comparison between a first feedback signal indicating a feedback current and a target signal indicating a target current peak. The voltage compensation circuit is configured to output a voltage compensation signal based on a comparison between a second feedback signal indicating a feedback voltage and a reference signal indicating a reference voltage. The summing circuit is configured to output the target signal based on the voltage compensation signal and an offset signal. The offset generation circuit is configured to output the offset signal based on a filtered voltage compensation signal. The filter is configured to output the filtered voltage compensation signal based on the voltage compensation signal.

BRIEF DESCRIPTION OF THE DRAWINGS

The same reference numbers or other reference designators are used in the drawings to designate the same or similar (functionally and/or structurally) features.

DETAILED DESCRIPTION

The following description provides many different examples for implementing different features of the provided subject matter. Specific examples of components and arrangements are described below to simplify the present description. The drawings are not drawn to scale.

Figure 1:
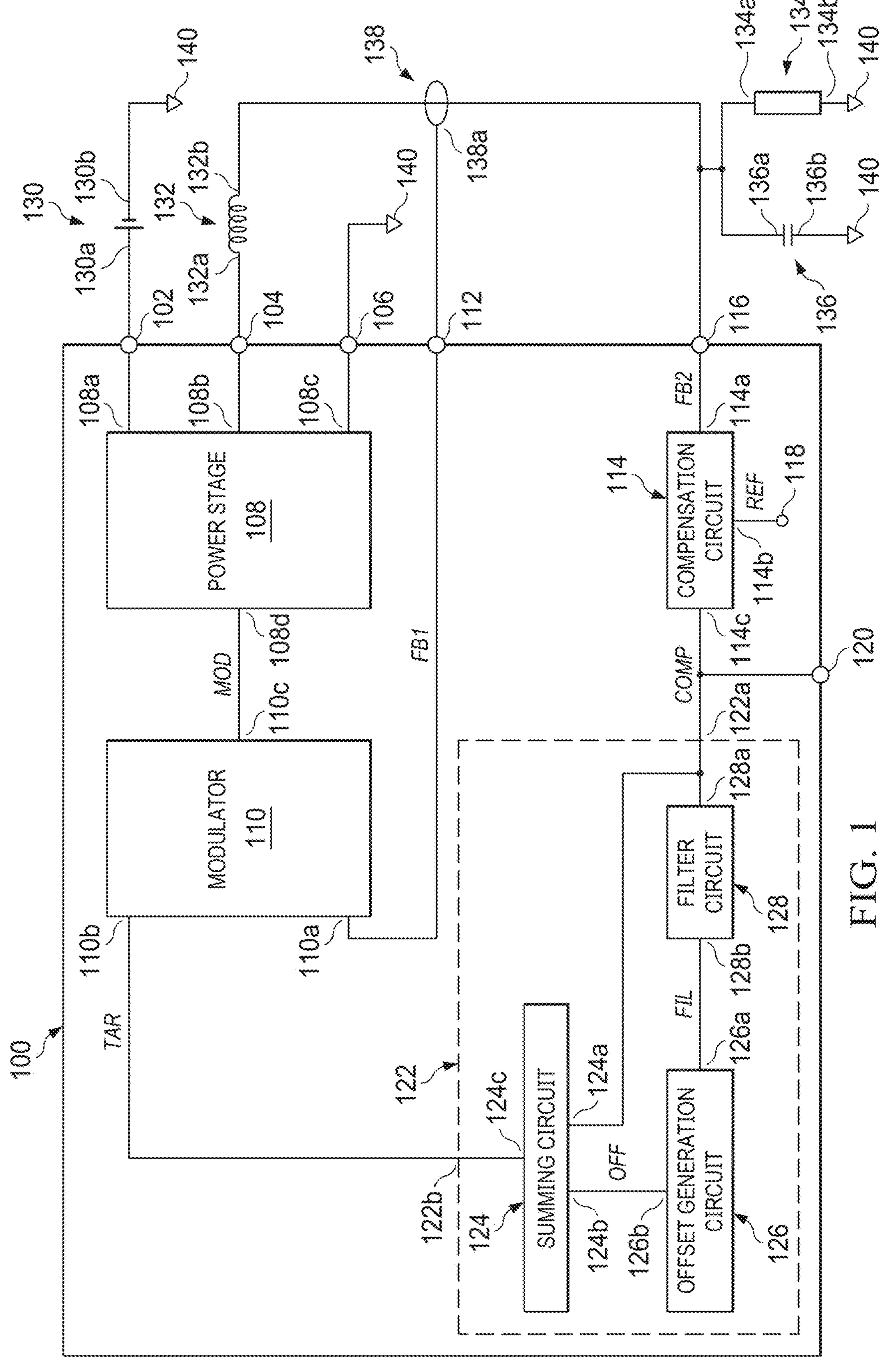
FIG. 1 is a circuit diagram of some examples of a system including a voltage converter circuit.

FIG. 1 is a circuit diagram of some examples of a system including a voltage converter circuit 100. The voltage converter circuit 100 includes a power stage circuit 108, a modulator circuit 110 and a voltage compensation circuit 114. The system includes the voltage converter circuit 100, a voltage source 130, an inductor 132, a load circuit 134, a capacitor 136, and a current sensing circuit 138. In the example illustrated in FIG. 1, the system forms a DC-DC buck converter which generates a voltage across the load circuit 134 that is less than a voltage across the voltage source 130.

A first terminal 108*a* of the power stage circuit 108 is coupled to a first terminal 102 of the voltage converter circuit 100. A second terminal 108*b* of the power stage circuit 108 is coupled to a second terminal 104 of the voltage converter circuit 100. A third terminal 108*c* of the power stage circuit 108 is coupled to a third terminal 106 of the voltage converter circuit 100.

An output 110*c* of the modulator circuit 110 is coupled to a control terminal 108*d* of the power stage circuit 108. A first input 110*a* of the modulator circuit 110 is coupled to a current feedback terminal 112 of the voltage converter circuit 100.

A first input 114*a* of the voltage compensation circuit 114 is coupled to a voltage feedback terminal 116 of the voltage converter circuit 100. A second input 114*b* of the voltage compensation circuit 114 is coupled to a voltage reference terminal 118. An output 114*c* of the voltage compensation circuit 114 is coupled to a compensation terminal 120 of the voltage converter circuit 100.

A first terminal 130*a* of the voltage source 130 is coupled to terminal 102 of the voltage converter circuit 100. A second terminal 130*b* of the voltage source 130 is coupled to ground 140. A first terminal 132*a* of the inductor 132 is coupled to terminal 104 of the voltage converter circuit 100. A second terminal 132*b* of the inductor 132 is coupled to a first terminal 134*a* of the load circuit 134. A second terminal 134*b* of the load circuit 134 is coupled to ground 140. The voltage feedback terminal 116 of the voltage converter circuit 100 is coupled to the first terminal 134*a* of the load circuit 134. A first terminal 136*a* of the capacitor 136 is coupled to the second terminal 132*b* of the inductor 132 and the first terminal 134*a* of the load circuit 134. A second terminal 136*b* of the capacitor 136 is coupled to ground 140. The current sensing circuit 138 is coupled between the second terminal 132*b* of the inductor 132 and the first terminal 134*a* of the load circuit 134. An output 138*a* of the current sensing circuit 138 is coupled to the current feedback terminal 112 of the voltage converter circuit 100.

The voltage compensation circuit 114 receives a second feedback signal FB2 at input 114*a* from the voltage feedback terminal 116. The second feedback signal FB2 indicates a feedback voltage (the voltage across the load circuit 134). The voltage compensation circuit 114 receives a reference signal REF at input 114*b* from the voltage reference terminal 118. The reference signal REF indicates a reference voltage. The voltage compensation circuit 114 outputs a voltage compensation signal COMP at output 114*c* based on a comparison between the second feedback signal FB2 and the reference signal REF.

The modulator circuit 110 receives a first feedback signal FB1 at input 110*a* from the current feedback terminal 112. The first feedback signal FB1 indicates a feedback current (e.g., the current in the inductor 132 as measured by the current sensing circuit 138). The modulator circuit 110 receives a target signal TAR at input 110*b*. The target signal TAR indicates a target current peak. The modulator circuit 110 outputs a modulated signal MOD at output 110*c* based on a comparison between the first feedback signal FB1 and the target signal TAR.

The power stage circuit 108 receives the modulated signal MOD at control terminal 108*d*. The power stage circuit 108 selectively couples terminal 102 to terminal 104 and selectively couples terminal 104 to terminal 106 based on the modulated signal MOD.

In some examples, the voltage converter circuit 100 operates in a peak current control mode where the modulator circuit 110 sets the modulated signal MOD to a first value (e.g., a logic "low" value) in response to the first feedback signal FB1 reaching the target signal TAR. Further, the modulator circuit 110 periodically (e.g., according to a clock signal) sets the modulated signal MOD to a second value (e.g., a logic "high" value).

In response to the modulated signal MOD having the second value (logic "high"), the power stage circuit 108 couples terminal 102 to terminal 104 and decouples terminal 104 from terminal 106, thus coupling the voltage source 130 to the load circuit 134 through the inductor 132. In response, current flows through inductor 132 from terminal 132*a* to terminal 132*b* and to the load circuit 134.

In response to the modulated signal MOD having the first value (logic "low"), the power stage circuit 108 decouples terminal 102 from terminal 104 and couples terminal 104 to terminal 106, thus decoupling the voltage source 130 from the inductor 132 and coupling the inductor 132 to ground 140. In response, inductor 132 generates a current which flows from terminal 132*a* to terminal 132*b* and to the load circuit 134.

The power stage circuit 108 performs this switching (coupling and decoupling between terminals 102, 104, 106) at relatively high frequencies. Consequently, switching losses in the power stage circuit 108 are increased. These increased switching losses cause the voltage converter circuit 100 to suffer from reduced efficiency when operating at lighter loads (e.g., when the current demand from the load circuit 134 is decreased).

To improve the efficiency of the voltage converter circuit 100 at lighter loads, the voltage converter circuit 100 includes a target control circuit 122 coupled between the output 114*c* of the voltage compensation circuit 114 and input 110*b* of the modulator circuit 110. An input 122*a* of the target control circuit 122 is coupled to the output 114*c* of the voltage compensation circuit 114. An output 122*b* of the target control circuit 122 is coupled to input 110*b* of the modulator circuit 110.

The target control circuit 122 receives the voltage compensation signal COMP at input 122*a* and outputs the target signal TAR at output 122*b* based on the voltage compensation signal COMP. In response to the load falling below a load threshold, the target control circuit 122 causes the voltage converter circuit 100 to switch from peak current control mode to frequency control mode. For example, in response to the load falling below a load threshold, the target control circuit 122 sets the target signal TAR to a controllable reference target value. This causes the power stage circuit 108 to perform the switching (coupling and decoupling between terminals 102, 104, 106) at a controllable reference target frequency, independent of voltage compensation signal COMP. Conversely, in response to the load rising above the load threshold, the target control circuit 122 causes the voltage converter circuit 100 to switch from frequency control mode to peak current control mode. For example, in response to the load rising above the load threshold, the target control circuit 122 sets the target signal TAR based on the voltage compensation signal COMP. By reducing the reference target frequency when operating in frequency control mode (during lighter loads), the switching losses in the power stage circuit 108 can be reduced. Thus, efficiency can be improved during lighter loads.

The target control circuit 122 includes a summing circuit 124 and an offset generation circuit 126. A first input 124*a* of the summing circuit 124 is coupled to output 114*c* of the voltage compensation circuit 114. A second input 124*b* of the summing circuit 124 is coupled to an output 126*b* of the offset generation circuit 126. An output 124*c* of the summing circuit 124 is coupled to input 110*b* of the modulator circuit 110.

The summing circuit 124 receives the voltage compensation signal COMP at input 124*a* and an offset signal OFF at input 124*b*. The summing circuit 124 outputs the target signal TAR at output 124*c* based on a sum of the compensation signal COMP and the offset signal OFF.

In some examples, the offset generation circuit 126 receives the voltage compensation signal COMP at input 126*a* and outputs the offset signal OFF based on the voltage compensation signal COMP. However, in such examples, the voltage converter circuit 100 may exhibit reduced performance during transitions between peak current control mode and frequency control mode.

Figure 2:
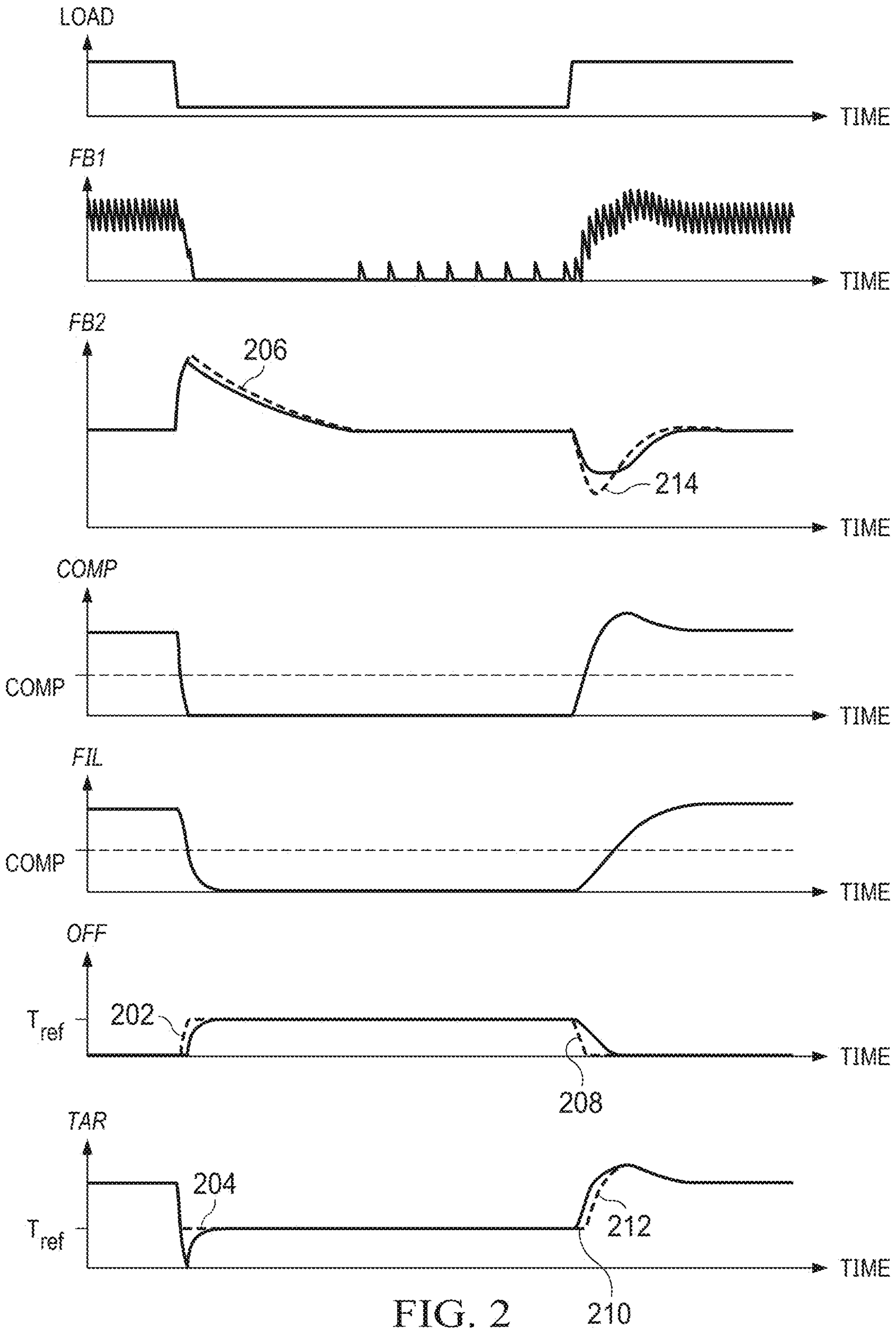
FIG. 2 is a diagram of some examples of signals corresponding to the system of FIG. 1.

For example, as shown in FIG. 2, in response to the load decreasing, the first feedback signal FB1 (indicating feedback current) decreases and the second feedback signal FB2 (indicating feedback voltage) increases. In response to the second feedback signal FB2 increasing, the voltage compensation signal COMP decreases. In examples where the offset generation circuit 126 outputs the offset signal OFF based on the voltage compensation signal COMP, the offset signal OFF increases in response to the voltage compensation signal COMP reaching (e.g., falling to or below) a compensation threshold $TH_{COMP}$, as shown by dashed line 202, so the target signal TAR (the sum of the offset signal OFF and the compensation signal COMP) does not fall below the reference target value $T_{ref}$, as shown by dashed line 204. Because the target signal TAR is prevented from falling below the reference target value $T_{ref}$ (despite the voltage compensation signal COMP continuing to fall after the target signal TAR reaches the reference target value $T_{ref}$), the voltage converter circuit 100 takes longer to correct the second feedback signal FB2 at this transition from peak current control mode to frequency control mode. As a result, the second feedback signal FB2 has increased overshoot at the transition, as shown by dashed line 206.

Further, as shown in FIG. 2, in response to the load increasing, the first feedback signal FB1 increases and the second feedback signal FB2 decreases. In response to the second feedback signal FB2 decreasing, the voltage compensation signal COMP increases. In examples where the offset generation circuit 126 outputs the offset signal OFF based on the voltage compensation signal COMP, the offset signal OFF decreases in response to the voltage compensation signal COMP increasing, as shown by dashed line 208. Because the offset signal OFF decreases as the voltage compensation signal COMP increases, the target signal TAR (the sum of the offset signal OFF and the voltage compensation signal COMP) remains approximately unchanged until the voltage compensation signal COMP reaches the compensation threshold $TH_{COMP}$ (and offset signal OFF reaches zero), as shown by dashed line 210. Only after the voltage compensation signal COMP reaches the compensation threshold $TH_{COMP}$ (and offset signal OFF reaches zero) does the target signal TAR begin substantially increasing, as shown by dashed line 212. Because of this delay in the target signal TAR response to the change in the voltage compensation signal COMP, the voltage converter circuit 100 takes longer to correct the second feedback signal FB2 at this transition from frequency control mode to peak current control mode. As a result, the second feedback signal FB2 has increased undershoot at the transition, as shown by dashed line 214.

To improve performance during the transitions between peak current control mode and frequency control mode, the target control circuit 122 of the voltage converter circuit 100 of FIG. 1 includes a filter circuit 128 coupled between the voltage compensation circuit 114 and the offset generation circuit 126. The filter circuit 128 is or includes a low pass filter. An input 128*a* of the filter circuit 128 is coupled to the output 114*c* of the voltage compensation circuit 114. An output 128*b* of the filter circuit 128 is coupled to the input 126*a* of the offset generation circuit 126.

The filter circuit 128 receives the voltage compensation signal COMP at input 128*a* and outputs the filtered voltage compensation signal FIL at output 128*b* based on the voltage compensation signal COMP. The offset generation circuit 126 receives the filtered voltage compensation signal FIL at input 126*a* and outputs the offset signal OFF at output 126*b* based on the filtered voltage compensation signal FIL. The filter circuit 128 adds a delay at the input 126*a* of the offset generation circuit 126 to improve the performance of the voltage converter circuit 100 during the transitions between the control modes.

For example, as shown in FIG. 2, in response to the load decreasing, the first feedback signal FB1 (indicating feedback current) decreases and the second feedback signal FB2 (indicating feedback voltage) increases. In response to the second feedback signal FB2 increasing, the voltage compensation signal COMP decreases. In response to the voltage compensation signal COMP decreasing, the filtered voltage compensation signal FIL decreases (at a reduced rate compared to voltage compensation signal COMP). In response to the filtered voltage compensation signal FIL reaching (e.g., falling to or below) the compensation threshold $TH_{COMP}$, the offset signal OFF increases. Because the filtered voltage compensation signal FIL decreases at a reduced rate (compared to the voltage compensation signal COMP), the filtered voltage compensation signal FIL reaches the compensation threshold $TH_{COMP}$ after the voltage compensation signal COMP is substantially below the compensation threshold $TH_{COMP}$ (e.g., when the voltage compensation signal COMP is approximately zero). Because of this delay in the filtered voltage compensation signal FIL reaching the compensation threshold $TH_{COMP}$, the target signal TAR (the sum of the offset signal OFF and the voltage compensation signal COMP) falls substantially below the reference target value $T_{ref}$. Because the target signal TAR decreases according to the decrease in the voltage compensation signal COMP during this transition from peak current control mode to frequency control mode, the voltage converter circuit 100 corrects the second feedback signal FB2 more quickly at the transition. As a result, the second feedback signal FB2 has reduced overshoot at the transition. For example, the overshoot may be reduced by about 5 percent or more. By reducing the overshoot in the second feedback signal FB2 (which indicates the voltage across the load circuit 134), voltage stress on the system can be reduced, reliability of the system can be improved, and functional safety of the system can be improved.

Further, as shown in FIG. 2, in response to the load increasing, the first feedback signal FB1 increases and the second feedback signal FB2 decreases. In response to the second feedback signal FB2 decreasing, the voltage compensation signal COMP increases. In response to the voltage compensation signal COMP increasing, the filtered voltage compensation signal FIL increases (at a reduced rate relative to the voltage compensation signal COMP). In response to the filtered voltage compensation signal FIL increasing at a reduced rate, the offset signal OFF decreases at a reduced rate. Because the decrease in the offset signal OFF is slower than the increase in the voltage compensation signal COMP, the target signal TAR (the sum of the offset signal OFF and the voltage compensation signal COMP) increases as the voltage compensation signal COMP increases. Thus, the delay illustrated by dashed line 210 can be reduced or eliminated. By reducing this delay, the voltage converter circuit 100 can correct the second feedback signal FB2 more quickly at this transition from frequency control mode to peak current control mode. Thus, the second feedback signal FB2 has reduced undershoot at the transition. For example, the undershoot may be reduced by about 6 percent or more. By reducing undershoot in the second feedback signal FB2 (which indicates the voltage across the load circuit 134), the reliability of the system can be improved. Further, the size of output capacitor 136 can be reduced and thus the cost of the system may be reduced.

Although FIG. 1 illustrates a buck converter, it will be appreciated that in some examples, the system may alternatively be configured as a boost converter, a buck-boost converter, or the like. In some examples, the system may be configured as a multi-phase DC-DC converter including a plurality of voltage converter circuits coupled to a corresponding plurality of inductors.

In some examples, the system is an automotive system where the voltage source 130 is a car battery (e.g., a 12 volt battery) and the load circuit 134 is a vehicle infotainment device, a vehicle instrument cluster, a vehicle stereo, an Advanced driver-assistance systems (ADAS), a sensor fusion system, a vehicle radar system, a motor drive system, or the like. In some examples, the voltage converter circuit 100 is formed on a single monolithic integrated chip.

Figure 3:
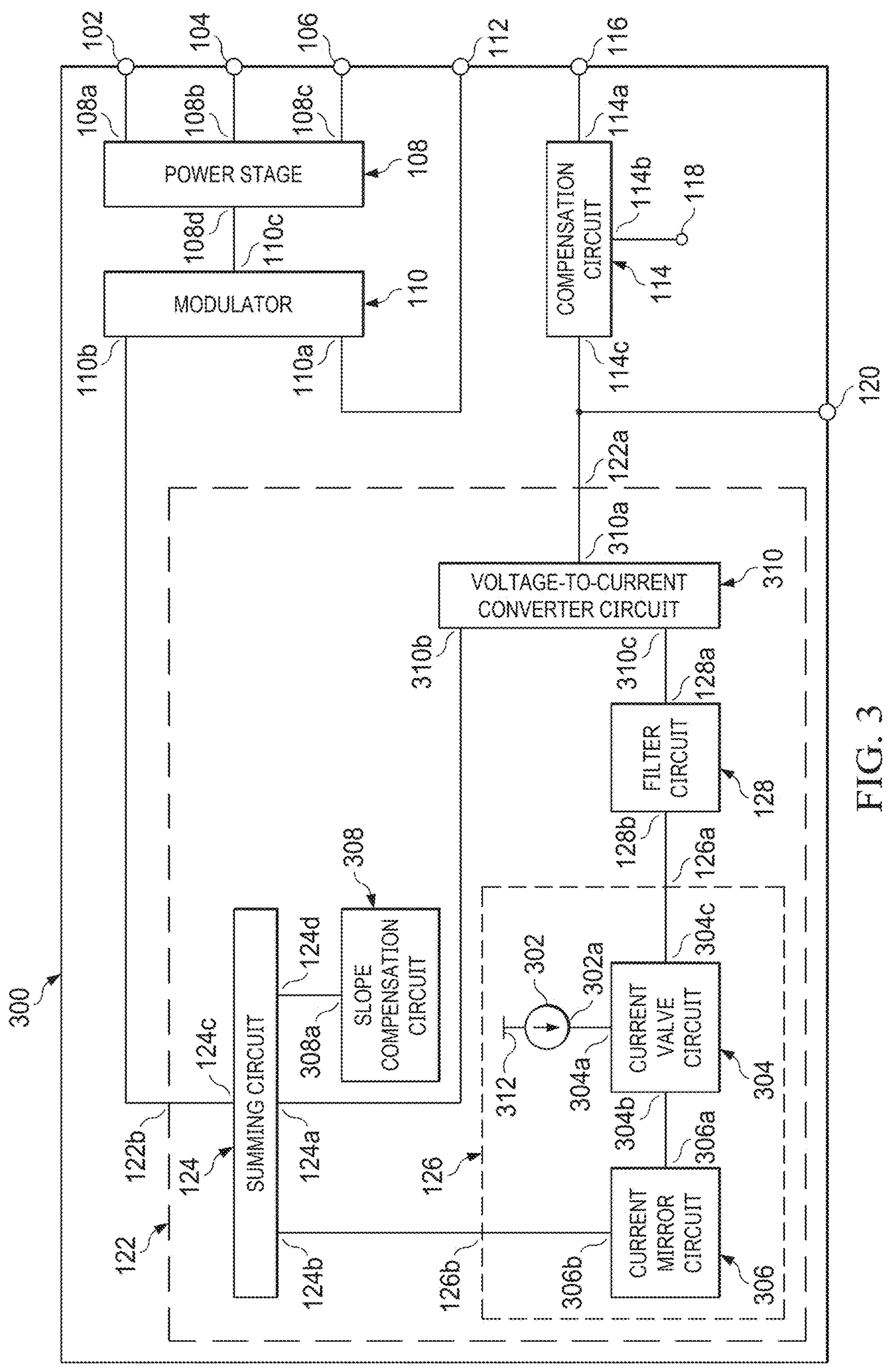
FIGS. 3-5, 6A, 6B are circuit diagrams of some other examples of voltage converter circuits similar to the voltage converter circuit of FIG. 1.

FIG. 3 is a circuit diagram of some examples of a voltage converter circuit 300 similar to the voltage converter circuit 100 of FIG. 1.

The target control circuit 122 includes a voltage-to-current converter circuit 310. An input 310*a* of the voltage-to-current converter circuit 310 is coupled to the output 114*c* of the voltage compensation circuit 114. A first output 310*b* of the voltage-to-current converter circuit 310 is coupled to input 124*a* of the summing circuit 124. A second output 310*c* of the voltage-to-current converter circuit 310 is coupled to the input 128*a* of the filter circuit 128.

The offset generation circuit 126 includes a current source circuit 302, a current valve circuit 304, and a current mirror circuit 306. The current source circuit 302 is coupled to a voltage source 312. An output 302*a* of the current source circuit 302 is coupled to an input 304*a* of the current valve circuit 304. A control terminal 304*c* of the current valve circuit 304 is coupled to the output 128*b* of the filter circuit 128. An output 304*b* of the current valve circuit 304 is coupled to an input 306*a* of the current mirror circuit 306. An output 306*b* of the current mirror circuit 306 is coupled to input 124*b* of the summing circuit 124.

The target control circuit 122 includes a slope compensation circuit 308. An output 308*a* of the slope compensation circuit 308 is coupled to a third input 124*d* of the summing circuit 124.

The voltage-to-current converter circuit 310 receives the voltage compensation signal at input 310*a* from the output 114*c* of voltage compensation circuit 114. The voltage-to-current converter circuit 310 outputs a converted voltage compensation signal at output 310*b* (e.g., converted from a voltage signal to a current signal) based on the voltage compensation signal. In addition, the voltage-to-current converter circuit 310 outputs an amplified voltage compensation signal at output 310*c* based on the voltage compensation signal.

The filter circuit 128 receives the amplified voltage compensation signal at input 128*a* and outputs the filtered voltage compensation signal at output 128*b* based on the amplified voltage compensation signal and a cutoff frequency of the filter circuit 128.

The current source circuit 302 outputs a reference target current signal at output 302*a*. The current valve circuit 304 receives the reference target current signal at input 304*a* and receives the filtered voltage compensation signal at control terminal 304*c*. The current valve circuit 304 outputs an offset current signal at output 304*b*. The offset current signal has a magnitude equal to a portion of the magnitude of the reference target current signal. The portion is based on the filtered voltage compensation signal. For example, the portion increases in response to the filtered voltage compensation signal increasing, and the portion decreases in response to the filtered voltage compensation signal decreasing. The current mirror circuit 306 receives the offset current signal at input 306*a* and outputs a copy of the offset current signal at output 306*b*.

The slope compensation circuit 308 outputs a slope compensation ramp signal at output 308*a*. The summing circuit 124 receives the copy of the offset current signal at input 124*b*, the converted voltage compensation signal at input 124*a*, and the slope compensation ramp signal at input 124*d*. The summing circuit 124 outputs the target signal based on a sum of the copy of the offset current signal, the converted voltage compensation signal, and the slope compensation ramp signal.

Figure 4:
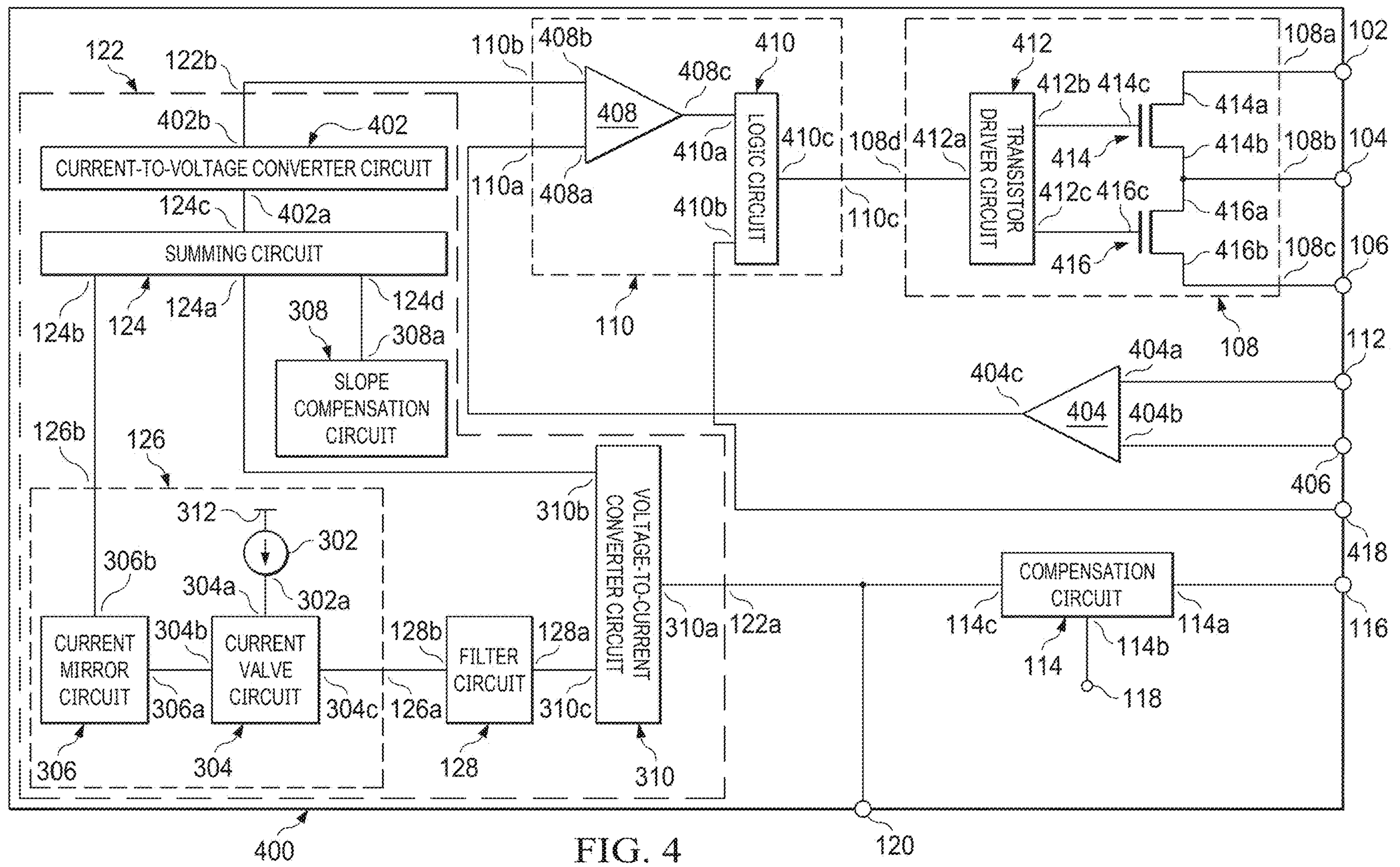

FIG. 4 is a circuit diagram of some examples of a voltage converter circuit 400 similar to the voltage converter circuit 300 of FIG. 3.

The target control circuit 122 includes a current-to-voltage converter circuit 402. An input 402*a* of the current-to-voltage converter circuit 402 is coupled to the output 124*c* of the summing circuit 124. An output 402*b* of the current-to-voltage converter circuit 402 is coupled to input 110*b* of the modulator circuit 110.

The circuit 400 includes a current sense amplifier circuit 404. A first input 404*a* of the current sense amplifier circuit 404 is coupled to current feedback terminal 112. A second input 404*b* of the current sense amplifier circuit 404 is coupled to a second current feedback terminal 406. An output 404*c* of the current sense amplifier circuit 404 is coupled to input 110*a* of the modulator circuit 110. In some examples, the current sense amplifier circuit 404 is coupled to a current sense resistor (not shown) which is coupled between an inductor (e.g., 132 of FIG. 1) and a load circuit (e.g., 134 of FIG. 1). For example, input 404*a* is coupled to a first terminal of the current sense resistor (through terminal 112) and input 404*b* is coupled to a second terminal of the current sense resistor (through terminal 406).

The current-to-voltage converter circuit 402 converts the target signal from a current signal to a voltage signal. The current sense amplifier circuit 404 converts the first feedback signal from a current signal to a voltage signal.

The modulator circuit 110 includes a comparator circuit 408 and a logic circuit 410. A first input 408*a* of the comparator circuit 408 is coupled to the output 404*c* of the current sense amplifier circuit 404. A second input 408*b* of the comparator circuit 408 is coupled to the output 402*b* of the current-to-voltage converter circuit 402. A first input 410*a* of the logic circuit 410 is coupled to an output 408*c* of the comparator circuit 408. A second input 410*b* of the logic circuit 410 is coupled to a clock terminal 418 of the voltage converter circuit 400.

The comparator circuit 408 receives the target signal at input 408*b* and the first feedback signal at input 408*a*. The comparator circuit 408 outputs a comparator output signal at output 408*c* based on a comparison between the target signal and the first feedback signal. The logic circuit 410 receives the comparator output signal at input 410*a* and a clock signal at input 410*b*. The logic circuit 410 outputs the modulated signal at output 410*c* based on the comparator output signal, the clock signal, and the logic of the logic circuit 410 (e.g., a logic table or the like).

The power stage circuit 108 includes a transistor driver circuit 412. An input 412*a* of the transistor driver circuit 412 is coupled to an output 410*c* of the logic circuit 410. In some examples, the power stage circuit 108 includes transistors 414, 416. A first terminal 414*a* of transistor 414 is coupled to terminal 102. A second terminal 414*b* of transistor 414 and a first terminal 416*a* of transistor 416 are coupled to terminal 104. A second terminal 416*b* of transistor 416 is coupled to terminal 106. A control terminal 414*c* of transistor 414 is coupled to a first output 412*b* of the transistor driver circuit 412. A control terminal 416*c* of transistor 416 is coupled to a second output 412*c* of the transistor driver circuit 412.

The transistor driver circuit 412 receives the modulated signal at input 412*a*. The transistor driver circuit 412 outputs a first driver signal at output 412*b* and a second driver signal at output 412*c*. The driver signals control transistors 414, 416 which selectively couple terminals 102, 104, 106 based on the driver signals.

In some examples, transistors 414, 416 are external to voltage converter circuit 400. In such examples, output 412*b* is coupled to terminal 102, output 412*c* is coupled to terminal 104, and terminal 106 is omitted from the voltage converter circuit 400. In such examples, transistors 414, 416 may be off-chip (on a separate chip) and control terminals 414*c*, 416*c* may be coupled to terminals 102, 104, respectively, by wiring that is external to the chips.

Figure 5:
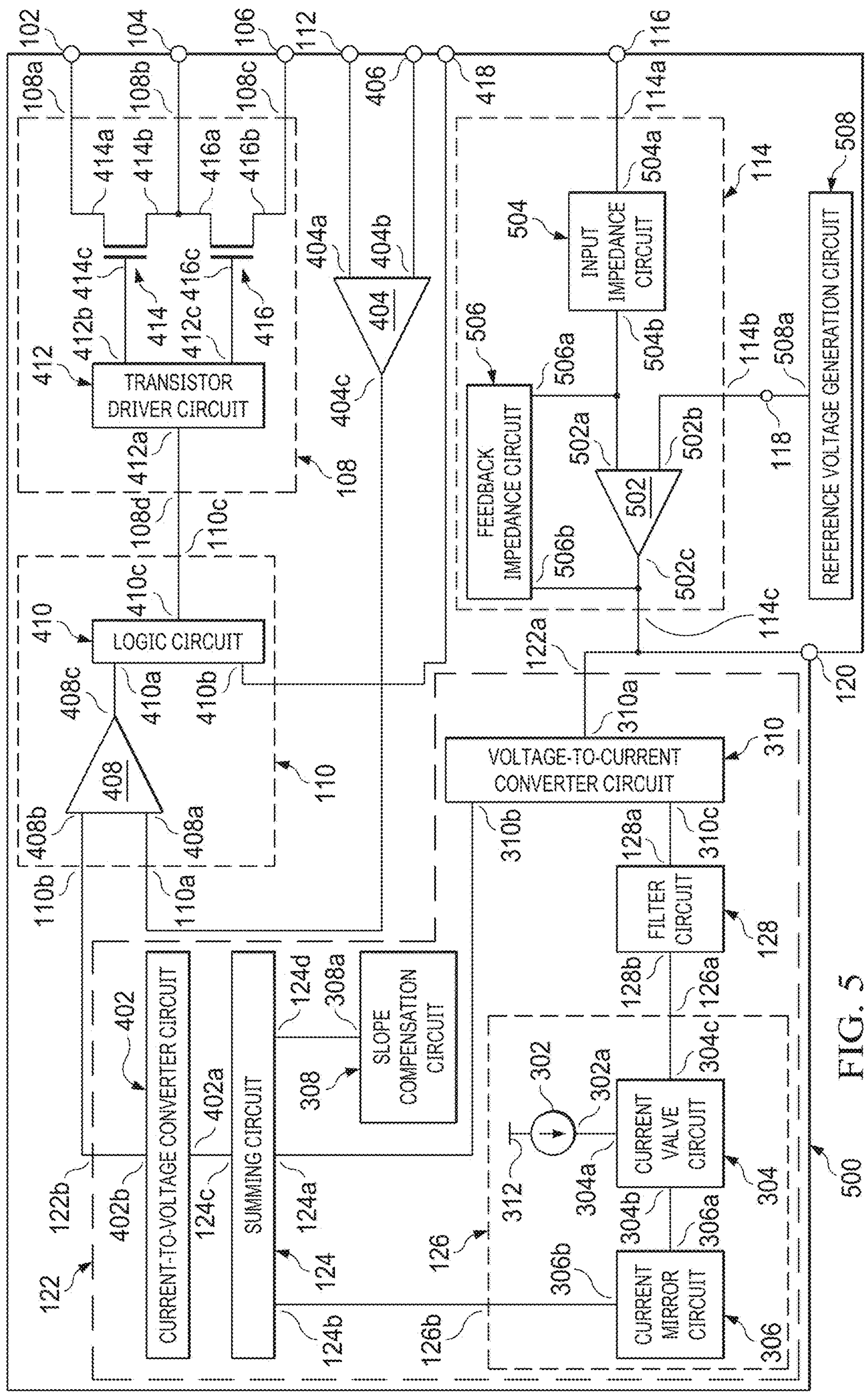

FIG. 5 is a circuit diagram of some examples of a voltage converter circuit 500 similar to the voltage converter circuit 400 of FIG. 4.

The voltage compensation circuit 114 includes an error amplifier 502. A first input 502*a* of the error amplifier 502 is coupled to the feedback voltage terminal 116. A second input 502*b* of the error amplifier 502 is coupled to an output 508*a* of a reference voltage generation circuit 508. The output 502*c* of the error amplifier 502 is coupled to the input 310*a* of the voltage-to-current converter circuit 310 and the compensation terminal 120.

The voltage compensation circuit 114 includes an input impedance circuit 504 coupled between the feedback voltage terminal 116 and input 502*a* of the error amplifier 502. For example, a first terminal 504*a* if the input impedance circuit 504 is coupled to the voltage feedback terminal 116 and a second terminal 504*b* of the input impedance circuit 504 is coupled to the first input 502*a* of the error amplifier.

The voltage compensation circuit 114 includes a feedback impedance circuit 506 coupled between input 502*a* of the error amplifier 502 and the output 502*c* of the error amplifier 502. For example, a first terminal 506*a* of the feedback impedance circuit 506 is coupled to the first input 502*a* of the error amplifier 502 and a second terminal 506*b* of the feedback impedance circuit 506 is coupled to the output 502*c* of the error amplifier 502.

A transfer function of the voltage compensation circuit 114 has at least one pole and at least one zero. The low pass filter of the filter circuit 128 has a time constant corresponding to a time delay. The time constant of the filter circuit 128 and the zero of the transfer function of the voltage compensation circuit 114 are approximately equal to optimize the delay generated by the filter circuit 128. In some cases, if the time constant is less than the zero and thus the delay is too short, the rate of change of the filtered voltage compensation signal may not be slow enough and thus the second feedback signal may have poor overshoot/undershoot at the transitions. If the time constant is too high and thus the delay is too long, the rate of change of the filtered voltage compensation signal may be too slow, the delay may be longer than necessary and thus performance may be reduced. By setting the time constant of the filter circuit 128 and the zero of the transfer function of the voltage compensation circuit 114 to be approximately equal, the length of the delay at the filter circuit 128 may be optimized according to the performance of the voltage compensation circuit 114 (e.g., the delay can be long enough but not too long).

Figure 6A:
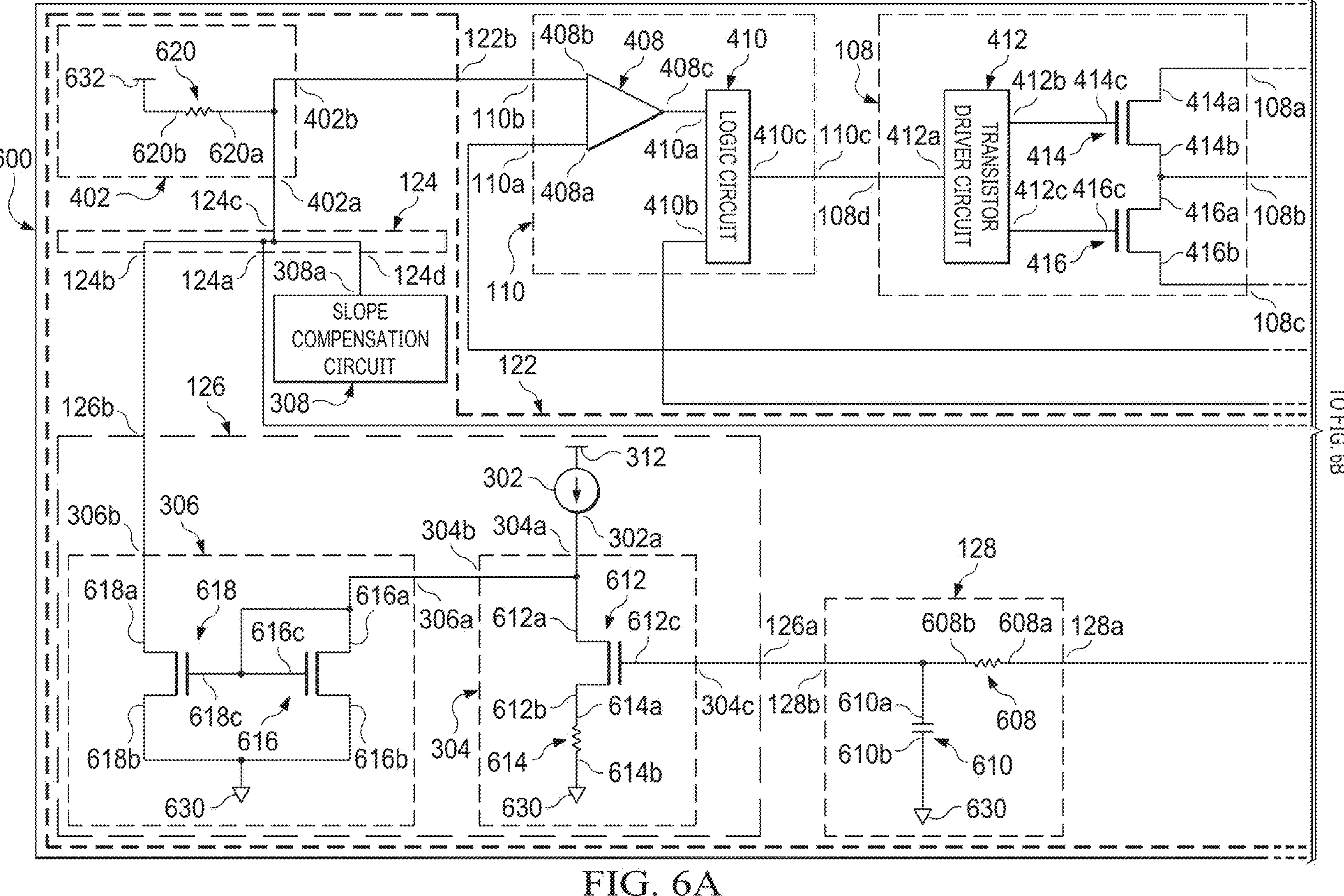
Figure 6B:
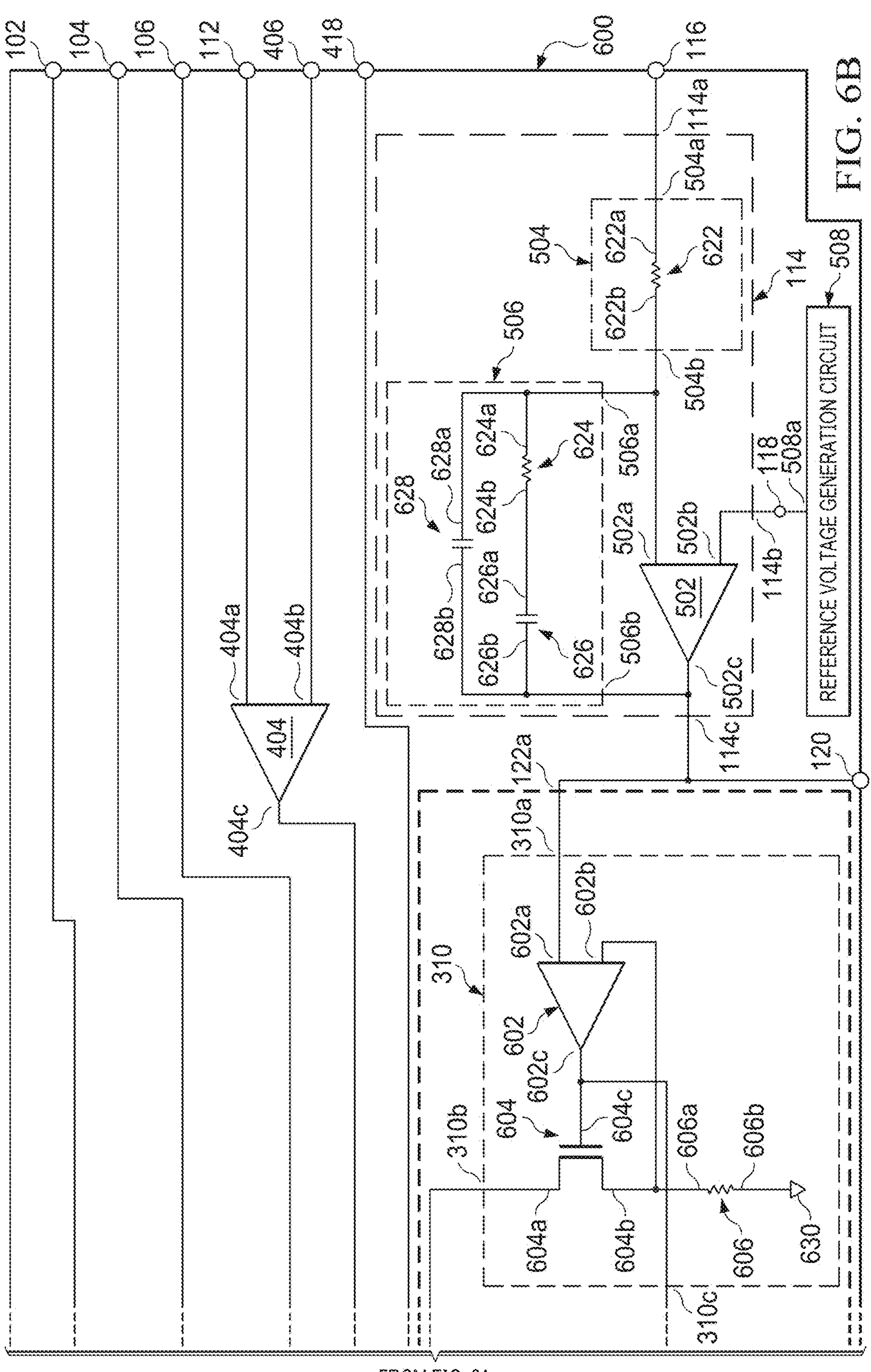

FIG. 6A and FIG. 6B are a circuit diagram of some examples of a voltage converter circuit 600 similar to the voltage converter circuit 500 of FIG. 5.

The voltage-to-current converter circuit 310 includes an amplifier 602, a transistor 604, and a resistor 606. A first terminal 602*a* of the amplifier 602 is coupled to the output 502*c* of the error amplifier 502. A second terminal 602*b* of the amplifier 602 is coupled to a second terminal 604*b* of transistor 604 and a first terminal 606*a* of resistor 606. An output 602*c* of the amplifier 602 is coupled to a control terminal 604*c* of transistor 604 and the input 128*a* of the filter circuit 128. A first terminal 604*a* of transistor 604 is coupled to input 124*a* of the summing circuit 124. A second terminal 606*b* of resistor 606 is coupled to ground 630. Transistor 604 passes a current from terminal 406*a* to terminal 604*b*. The magnitude of the current is based on the voltage at terminal 602*a*.

The filter circuit 128 includes a resistor 608 and a capacitor 610. A first terminal 608*a* of resistor 608 is coupled to the output 602*c* of amplifier 602. A second terminal 608*b* of resistor 608 is coupled to a first terminal 610*a* of capacitor 610 and the control terminal 304*c* of the current valve circuit 304. A second terminal 610*b* of capacitor 610 is coupled to ground 630.

The current valve circuit 304 includes a transistor 612 and a resistor 614. A first terminal 612*a* of transistor 612 is coupled to the output 302*a* of the current source circuit 302 and the input 306*a* of the current mirror circuit 306. A second terminal 612*b* of transistor 612 is coupled to a first terminal 614*a* of resistor 614. A control terminal 612*c* of transistor 612 is coupled to terminal 608*b* of resistor 608 and terminal 610*a* of capacitor 610. A second terminal 614*b* of resistor 614 is coupled to ground 630. A first portion of the current from output by the current source circuit 302 is output to the current mirror circuit 306. Transistor 612 passes a second portion of the current from the current source circuit 302 to ground 630 based on the magnitude of the voltage at terminal 608*b* of resistor 608 and terminal 610*a* of capacitor 610.

The current mirror circuit 306 includes a first transistor 616 and a second transistor 618. A first terminal 616*a* of transistor 616 is coupled to the output 302*a* of the current source circuit 302 and the first terminal 612*a* of transistor 612. A second terminal 616*b* of transistor 616 is coupled to ground 630. A control terminal 616*c* of transistor 616 is coupled to a control terminal 618*c* of transistor 618 and to terminal 616*a* of transistor 616. A first terminal 618*a* of transistor 618*a* is coupled to input 124*b* of summing circuit 124. A second terminal 618*b* of transistor 618 is coupled to ground 630.

The summing circuit shorts input 124*a*, input 124*b*, and input 124*d* to output 124*c*. For example, terminal 618*a* of transistor 618, terminal 604*a* of transistor 604, and output 308*a* of the slope compensation circuit 308 are coupled together and to input 408*b* of the comparator circuit 408.

The current-to-voltage converter circuit 402 includes a resistor 620 and a voltage terminal 632 (e.g., a voltage supply terminal or a ground terminal). A first terminal 620*a* of resistor 620 is coupled to terminal 618*a* of transistor 618, terminal 604*a* of transistor 604, output 308*a* of the slope compensation circuit 308, and input 408*b* of comparator circuit 408. A second terminal 620*b* of resistor 620 is coupled to the voltage terminal 632.

The input impedance circuit 504 includes a resistor 622 having a first terminal 622*a* coupled to terminal 116 and a second terminal 622*b* coupled to input 502*a* of the error amplifier 502.

The feedback impedance circuit 506 includes a resistor 624, a capacitor 626, and a capacitor 628. A first terminal 624*a* of resistor 624 and a first terminal 628*a* of capacitor 628 are coupled to input 502*a* of error amplifier 502. A second terminal 624*b* of resistor 624 is coupled to a first terminal 626*a* of capacitor 626. A second terminal 626*b* of capacitor 626 and a second terminal 628*b* of capacitor 628 are coupled to the output 502*c* of error amplifier 502.

As described with regard to FIG. 5, the time constant of the filter circuit 128 is approximately equal to the zero of the transfer function of the voltage compensation circuit 114 to optimize the delay caused by the filter circuit 128. In other words, the cutoff frequency of the filter circuit 128 is approximately equal to the zero frequency of the transfer function of the voltage compensation circuit 114. This can be achieved in the circuit 600 of FIG. 6A and FIG. 6B by making the product of the resistance of resistor 608 and the capacitance of capacitor 610 approximately equal to the product of the resistance of resistor 624 and the capacitance of capacitor 626.

Although the voltage compensation circuit 114 of FIG. 6A and FIG. 6B includes internal compensation where the input impedance circuit 504 and the feedback impedance circuit 506 are internal to the voltage converter circuit 600 (e.g., the input impedance circuit 504 and the feedback impedance circuit 506 are on the same chip as the other components of circuit 600), it will be appreciated that in some other examples, the voltage compensation circuit 114 may include external compensation where the input impedance circuit 504 and the feedback impedance circuit 506 are external to the voltage converter circuit 600 (e.g., the input impedance circuit 504 and the feedback impedance circuit 506 are a different chip than the other components of circuit 600). In such examples, the feedback impedance circuit 506 is coupled to the compensation terminal 120 and the input impedance circuit 504 is coupled to the voltage feedback terminal 116 by external wiring. In such examples, resistor 608 and capacitor 610 are variable so that their resistance and capacitance, respectively, can be adjusted (e.g., via an additional terminal of the circuit 600) based on resistance and capacitance of the external feedback impedance circuit in order to optimize the delay of the filter circuit 128 according to the external feedback impedance.

Although the voltage compensation (of the zeros and poles) circuit 114 of FIG. 6A and FIG. 6B includes a type II compensator, it will be appreciated that voltage compensation circuit 114 could alternatively include a type III compensator or some other type of compensator.

The methods are illustrated and described above as a series of acts or events, but the illustrated ordering of such acts or events is not limiting. For example, some acts or events may occur in different orders and/or concurrently with other acts or events apart from those illustrated and/or described herein. Also, some illustrated acts or events are optional to implement one or more aspects or embodiments of this description. Further, one or more of the acts or events depicted herein may be performed in one or more separate acts and/or phases. In some embodiments, the methods described above may be implemented in a computer readable medium using instructions stored in a memory.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero. Modifications are possible in the described examples, and other implementations are possible, within the scope of the claims.

What is claimed is:

1. A circuit comprising:

a power stage circuit having an input and an output;

a modulator circuit having a first input, a second input, and an output, the first input of the modulator circuit coupled to a current feedback terminal, the output of the modulator circuit coupled to the input of the power stage circuit;

a voltage compensation circuit having a first input, a second input, and an output, the first input of the voltage compensation circuit coupled to a voltage feedback terminal, the second input of the voltage compensation circuit coupled to a voltage reference terminal, the output of the voltage compensation circuit coupled to a compensation terminal;

a summing circuit having a first input, a second input, and an output, the first input of the summing circuit coupled to the output of the voltage compensation circuit, the output of the summing circuit coupled to the second input of the modulator circuit;

an offset generation circuit having an input and an output, the output of the offset generation circuit coupled to the second input of the summing circuit; and a filter circuit having an input and an output, the input of the filter circuit coupled to the output of the voltage compensation circuit, the output of the filter circuit coupled to the input of the offset generation circuit.

2. The circuit of claim 1, the offset generation circuit including:

a current source having an output; and a current valve circuit having an input, an output, and a control terminal, the input of the current valve circuit coupled to the output of the current source, the output of the current valve circuit coupled to the second input of the summing circuit, the control terminal of the current valve circuit coupled to the output of the filter circuit.

3. The circuit of claim 2, the offset generation circuit further including:

a current mirror circuit having an input and an output, the input of the current mirror circuit coupled to output of the current valve circuit, the output of the current mirror circuit coupled to the second input of the summing circuit.

4. The circuit of claim 1, the summing circuit having a third input, the circuit further comprising:

a slope compensation circuit having an output coupled to the third input of the summing circuit.

5. The circuit of claim 1, the voltage compensation circuit including:

an error amplifier having a first input, a second input, and an output, the second input of the error amplifier coupled to the voltage reference terminal, the output of the error amplifier coupled to the input of the filter circuit, an input impendence circuit having a first terminal coupled to the voltage feedback terminal and a second terminal coupled to the first input of the error amplifier, and a feedback impedance circuit having a first terminal coupled to the first input of the error amplifier and a second terminal coupled to the output of the error amplifier, the filter circuit including a low pass filter, wherein a transfer function of the voltage compensation circuit has a pole and a zero, wherein the low pass filter has a time constant, and wherein the time constant is approximately equal to the zero.

6. The circuit of claim 1, further comprising:

a voltage-to-current converter circuit having an input, a first output, and second output, the input coupled to the output of the voltage compensation circuit, the first output of the voltage-to-current converter circuit coupled to the first input of the summing circuit, the second output of the voltage-to-current converter circuit coupled to the input of the filter circuit.

7. The circuit of claim 6, wherein the current feedback terminal is a first current feedback terminal, the circuit further comprising:

a current sense amplifier circuit having a first input, a second input, and an output, the first input of the current sense amplifier circuit coupled to the first current feedback terminal, the second input of the current sense amplifier circuit coupled to a second current feedback terminal, the output of the current sense amplifier circuit coupled to the first input of the modulator circuit; and a current-to-voltage converter circuit having an input and an output, the input of the current-to-voltage converter circuit coupled to the output of the summing circuit, the output of the current-to-voltage converter circuit coupled to the second input of the modulator circuit.

8. The circuit of claim 7, the modulator circuit including:

a comparator circuit having a first input, a second input, and an output, the first input of the comparator circuit coupled to the output of the current sense amplifier circuit, the second input of the comparator circuit coupled to the output of the current-to-voltage converter circuit; and a logic circuit having an input and an output, the input of the logic circuit coupled to the output of the comparator circuit, the output of the logic circuit coupled to the input of the power stage circuit.

9. The circuit of claim 8, the power stage circuit including:

a transistor driver circuit having an input and an output, the input of the transistor driver circuit coupled to the output of the logic circuit.

10. A circuit comprising:

a voltage-to-current converter circuit having an input, a first output, and a second output;

a summing circuit having a first input, a second input, and an output, the first input of the summing circuit coupled to the first output of the voltage-to-current converter circuit;

a current mirror circuit having an input and an output, the output of the current mirror circuit coupled to the second input of the summing circuit;

a current valve circuit having an input, an output, and a control terminal, the output of the current valve circuit coupled to the input of the current mirror circuit;

a current source circuit having an output coupled to the input of the current valve circuit; and a filter circuit having an input and an output, the input of the filter circuit coupled to the second output of the voltage-to-current converter circuit, the output of the filter circuit coupled to the control terminal of the current valve circuit.

11. The circuit of claim 10, the summing circuit having a third input, the circuit further comprising:

a slope compensation circuit having an output coupled to the third input of the summing circuit.

12. The circuit of claim 11, the filter circuit including:

a first resistor having a first terminal and a second terminal, the first terminal of the first resistor coupled to the second output of the voltage-to-current converter circuit; and a capacitor having a first terminal and a second terminal, the first terminal of the capacitor coupled to the second terminal of the first resistor and the control terminal of the current valve circuit, the second terminal of the capacitor coupled to ground.

13. The circuit of claim 12, the voltage-to-current converter circuit including:

an amplifier having a first input, a second input, and an output, the first terminal of the amplifier coupled to the input of the voltage-to-current converter circuit;

a first transistor having a first terminal, a second terminal, and a control terminal, the first terminal of the first transistor coupled to the first input of the summing circuit, the second terminal of the first transistor coupled to the second input of the amplifier, the control terminal of the first transistor coupled to the output of the amplifier and the first terminal of the first resistor; and a second resistor having a first terminal and a second terminal, the first terminal of the second resistor coupled to the second terminal of the first transistor, the second terminal of the first resistor coupled to ground.

14. The circuit of claim 13, the current valve circuit including:

a second transistor having a first terminal, a second terminal, and a control terminal, the first terminal of the second transistor coupled to the output of the current source circuit and the input of the current mirror circuit, the control terminal of the second transistor coupled to the second terminal of the first resistor and the first terminal of the capacitor; and a third resistor having a first terminal and a second terminal, the first terminal of the third resistor coupled to the second terminal of the second transistor, the second terminal of the third resistor coupled to ground.

15. The circuit of claim 14, the current mirror circuit including:

a third transistor having a first terminal, a second terminal, and a control terminal, the first terminal of the third transistor coupled to the first terminal of the second transistor and the output of the current source circuit, the second terminal of the third transistor coupled to ground, the control terminal of the third transistor coupled to the first terminal of the third transistor; and a fourth transistor having a first terminal, and second terminal, and a control terminal, the first terminal of the fourth transistor coupled to the second input of the summing circuit, the second terminal of the fourth transistor coupled to ground, the control terminal of the fourth transistor coupled to the control terminal of the third transistor.

16. The circuit of claim 15, the first terminal of the fourth transistor coupled to the first terminal of the first transistor and the output of the slope compensation circuit.

17. The circuit of claim 16, further comprising:

a fourth resistor having a first terminal and a second terminal, the first terminal of the fourth resistor coupled to the first terminal of the fourth transistor, the first terminal of the first transistor, and the output of the slope compensation circuit, the second terminal of the fourth resistor coupled to a voltage supply terminal.

18. A circuit comprising:

a power stage circuit configured to output a switching signal based on a modulated signal;

a modulator circuit configured to output the modulated signal based on a comparison between a first feedback signal indicating a feedback current and a target signal indicating a target current peak;

a voltage compensation circuit configured to output a voltage compensation signal based on a comparison between a second feedback signal indicating a feedback voltage and a reference signal indicating a reference voltage;

a summing circuit configured to output the target signal based on the voltage compensation signal and an offset signal;

an offset generation circuit configured to output the offset signal based on a filtered voltage compensation signal; and a filter circuit configured to output the filtered voltage compensation signal based on the voltage compensation signal.

19. The circuit of claim 18, further comprising:

a voltage-to-current converter circuit configured to output a converted voltage compensation signal and an amplified voltage compensation signal based on the voltage compensation signal, wherein the summing circuit is configured to output the target signal based on a sum of the converted voltage compensation signal and the offset signal, wherein the filter circuit is configured to output the filtered voltage compensation signal based on the amplified voltage compensation signal.

20. The circuit of claim 19, further comprising:

a slope compensation circuit configured to output a slope compensation ramp signal, wherein the summing circuit is configured to output the target signal based on a sum of the converted voltage compensation signal, the offset signal, and the slope compensation ramp signal.

* * * * *